(12) United States Patent
Suzuki et al.

(10) Patent No.: US 7,198,478 B2
(45) Date of Patent: Apr. 3, 2007

(54) METHOD AND APPARATUS OF TREATING A DISC PLATE

(75) Inventors: Takayuki Suzuki, Chiba (JP); Masahiro Nakamura, Saitama (JP); Hideo Kobayashi, Tokyo (JP); Shinichi Shinohara, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 10/846,530

(22) Filed: May 17, 2004

(65) Prior Publication Data

US 2004/0212116 A1  Oct. 28, 2004

Related U.S. Application Data

(62) Division of application No. 09/973,048, filed on Oct. 10, 2001, now Pat. No. 6,740,269.

(30) Foreign Application Priority Data

Mar. 28, 2001  (JP)  ............................. 2001-092451
Jun. 29, 2001  (JP)  ............................. 2001-197738

(51) Int. Cl.
*G11B 7/26* (2006.01)
*B29C 71/02* (2006.01)
(52) U.S. Cl. ............... 425/135; 425/143; 425/810; 264/40.1; 264/40.6; 264/237; 264/310; 264/348
(58) Field of Classification Search ............... 264/40.1, 264/237, 40.6, 310, 348; 425/143, 810, 135
See application file for complete search history.

(56) References Cited

U.S. PATENT DOCUMENTS 5,686,026 A * 11/1997 Ebina ..................... 264/1.33
5,858,414 A * 1/1999 Hayashi et al. ............... 425/73

(Continued)

FOREIGN PATENT DOCUMENTS

EP    0 793 224 A1    9/1997

(Continued)

OTHER PUBLICATIONS

Derwent Abstract, "Computer disc rectification after deformation heating" (1972).*

*Primary Examiner*—Stefan Staicovici
(74) *Attorney, Agent, or Firm*—McDermott Will & Emery LLP

(57) ABSTRACT

A method of treating a disc plate. has the following operations of: molding a mold disc plate through an injection molding; and spinning the mold disc plate at a high spin speed. The spinning operation has at least one of the following two sub-operations of: reducing a warp of the mold disc plate with a centrifugal force caused during the spinning operation, and reducing a temperature of the mold disc plate during the spinning operation. Moreover, an apparatus of treating a disc plate has: a conveyer for conveying a mold disc plate obtained through an injection molding; a disc bench for receiving the mold disc plate conveyed with the conveyer; and a spin driver for spinning the disc bench when a temperature of the mold disc plate is higher than 90° C., to thereby spin the mold disc plate.

10 Claims, 8 Drawing Sheets

U.S. PATENT DOCUMENTS

| | | | |
|---|---|---|---|
| 6,046,801 A * | 4/2000 | Liu et al. ................. | 356/237.1 |
| 6,136,133 A | 10/2000 | Maruyama et al. | |
| 6,159,572 A | 12/2000 | Kobayashi et al. | |
| 6,416,609 B1 | 7/2002 | Imada et al. | |
| 2002/0009602 A1 | 1/2002 | Kitayama et al. | |

FOREIGN PATENT DOCUMENTS

| | | | |
|---|---|---|---|
| EP | 0 869 488 A2 | | 10/1998 |
| JP | 09-097456 | * | 4/1987 |
| JP | 62-165731 | | 7/1987 |
| JP | 02-253909 | * | 10/1990 |
| JP | 4-85734 | | 3/1992 |
| JP | 09-167384 | * | 6/1997 |
| JP | 10-64119 | | 3/1998 |
| JP | 10-154357 | | 6/1998 |
| JP | 11-345435 | | 12/1999 |

* cited by examiner

< 3000 rpm

≥ 3000 rpm

METHOD AND APPARATUS OF TREATING A DISC PLATE

This application is a divisional of application Ser. No. 09/973,048 filed Oct. 10, 2001 now U.S. Pat. No. 6,740,269.

BACKGROUND OF THE INVENTION

1. Field of the Invention

The present invention relates to a method and apparatus for treating a disc plate. More specifically, the present invention relates to the method and the apparatus for reducing a warp of an optical disc such as a digital video disc (hereinafter referred to as "DVD") and a compact disc. Especially, the warp is the one that is caused to a disc plate (of the optical disc) which has been molded through an injection molding. With the thus reduced warp, the disc plate is flattened.

2. Description of the Related Art

Generally, an optical disc plate such as a DVD plate and a compact disc plate is molded through an injection molding.

As is seen in FIG. 14(A), FIG. 14(B) and FIG. 14(C), there is provided a method of molding a disc plate 1. A resin material is injected into a pair of a first metal mold 10 and a second metal mold 11 for an injection molding. After the injection molding, the resin material is molded into a mold disc plate 1' which is to be solidified to become the disc plate 1. At this point in time, a predetermined information is recorded on one of two surfaces of the mold disc plate 1'. After this, as is seen in FIG. 14(B), the first metal mold 10 and the second metal mold 11 are separated from each other (opened). Then, a takeout arm 12 of a takeout mechanism (not shown) moves forward into an area between the first metal mold 10 and the second metal mold 11, to thereby securely absorb the mold disc plate 1' which is high in temperature and is still soft. After this, the takeout arm 12 moves backward, to thereby take the mold disc plate 1' out of the first metal mold 10 and the second metal mold 11.

Then, as is seen in FIG. 14(C), in a predetermined position, the thus taken out mold disc plate 1' is fixedly absorbed directly with a conveyer arm 13 of a conveyance mechanism. The conveyer arm 13 conveys the mold disc plate 1' to a cooling stage 14 (next operation).

More specifically, the mold disc plate 1' has a first surface and a second surface opposite to the first surface. On the first surface, the mold disc plate 1' is fixedly absorbed to a tip end 12A of the takeout arm 12. On the second surface, the mold disc plate 1' is fixedly absorbed to a tip end 13A of the conveyer arm 13. Simultaneously with the absorption of the mold disc plate 1' to the tip end 13A, the tip end 12A releases (namely, stops absorbing) the mold disc plate 1'. Then, the conveyer arm 13 turns by substantially 180° with the mold disc plate 1' fixedly absorbed to the tip end 13A. Thereafter, the conveyer arm 13 conveys the mold disc plate 1' to the cooling stage 14. The mold disc plate 1' is cooled with the cooling stage 14, to thereby solidify the resin material of the mold disc plate 1'. After the solidification, the mold disc plate 1' is referred to as the disc plate 1. The solidification temperature for solidifying the resin material is, for instance, about 90° C.

As described above, the mold disc plate 1' soon after being taken out of the first metal mold 10 and the second metal mold 11 is high in temperature, and is sufficiently soft. Therefore, during the sequential operations of i) cooling, ii) solidification of resin material, and iii) becoming the disc plate 1, the mold disc plate 1' causes a considerable deformation such as warp. Conventionally, various methods are taken so as to reduce the warp by adjusting conditions of the injection mold as below:

i) Adjust temperature of the first metal mold 10 and the second metal mold 11 of a mold machine.
ii) Set up temperature difference between the first metal mold 10 and the second metal mold 11.
iii) Adjust pressure for injecting the resin material.

Even if the warp of the mold disc plate 1' is small and reduced through the conventional methods as described above, the mold disc plate 1' causes the warp during the time the mold disc plate 1' is taken out of the first metal mold 10 and the second metal mold 11, and during the time the mold disc plate 1' is conveyed to the cooling stage 14. The thus caused warp is attributable to the following repeated description, that is, "The mold disc plate 1' soon after being taken out of the first metal mold 10 and the second metal mold 11 of the mold machine is high in temperature and is sufficiently soft." Moreover, the thus caused warp grows during the cooling operation.

The warp is more specifically described in FIG. 15(A), FIG. 15(B) and FIG. 15(C). The mold disc plate 1' is taken out of the first metal mold 10 and the second metal mold 11 of the mold machine. As is seen in FIG. 15(A), the mold disc plate 1' is fixedly absorbed to the tip end 12A of the takeout arm 12. Moreover (otherwise), the mold disc plate 1' is fixedly absorbed to the tip end 13A of the conveyer arm 13. The mold disc plate 1' is high in temperature and is sufficiently soft. Therefore, the mold disc plate 1' causes the warp when the mold disc plate 1' is absorbed substantially in the center area of the mold disc plate 1', in such a manner that the warp is bent opposite {(rightward in FIG. 15(A)} to an absorption side. Especially, the DVD having a thickness of about 0.6 mm (thin) shows the warp (bend) more outstanding than the compact disc having a thickness of about 1.2 mm. Moreover, as is seen in FIG. 15(B), the mold disc plate 1' is turned by the takeout arm 12 at a comparatively high speed with the mold disc plate 1' absorbed by the takeout arm 12, and the mold disc plate 1' is conveyed by the conveyer arm 13 at a comparatively high speed with the mold disc plate 1' absorbed by the conveyer arm 13. The above turn and conveyance of the mold disc plate 1' causes a wind pressure, to thereby warp the mold disc plate 1'. Moreover, as is seen in FIG. 15(C), the mold disc plate 1' is cooled on a disc bench 15 of the cooling stage 14. The mold disc plate 1' has such a dead weight as to, as the case may be, cause the warp during a cooling time on the disc bench 15. Still furthermore, some other cooling stages having different constitution cause a partial deformation of the mold disc plate 1' during the cooling time.

The above warp is caused around a center hole (not shown) of the mold disc plate 1' radially outward, to thereby form substantially a point symmetry. Some other warps run in such a manner as to form a bilateral symmetry (rightward and leftward) with respect to one to three line(s) through the center hole. The above warps become more obvious as production cycle time of the disc plate 1 is shortened, to thereby encourage the warp (more complicated and larger) of the disc plate 1.

BRIEF SUMMARY OF THE INVENTION

It is an object of the present invention to provide a method and an apparatus for treating a disc plate.

More specifically, it is the object of the present invention to obtain the disc plate having a warp or a deformation within an allowable limit (tolerance), or to obtain the disc plate which is substantially free from the warp or the deformation. For obtaining the above disc plate, a mold disc plate is spun, during the time the resin material of the mold disc plate is soft (in other words, before solidification of the resin material), at such a high speed as to cause a centrifugal force. Simultaneously with this, the mold disc plate is cooled down. The centrifugal force helps reduce the warp and the deformation.

According to a first aspect of the present invention, there is provided a method of treating a disc plate. The method comprises the following operations of: molding a mold disc plate through an injection molding; and spinning the mold disc plate at a high spin speed. The spinning operation comprises at least one of the following two sub-operations of: reducing a warp of the mold disc plate with a centrifugal force caused during the spinning operation, and reducing a temperature of the mold disc plate during the spinning operation.

According to a second aspect of the present invention, there is provided an apparatus of treating a disc plate. The apparatus comprises: a conveyer for conveying a mold disc plate obtained through an injection molding; a disc bench for receiving the mold disc plate conveyed with the conveyer; and a spin driver for spinning the disc bench when a temperature of the mold disc plate is higher than 90° C., to thereby spin the mold disc plate.

The other objects and features of the present invention will become understood from the following description with reference to the accompanying drawings.

DETAILED DESCRIPTION OF THE EMBODIMENT

Under the present invention, the mold disc plate 1' is defined as a disc plate before solidifying resin material, while the disc plate 1 is defined as a disc plate after solidifying the resin material.

Figure 1:
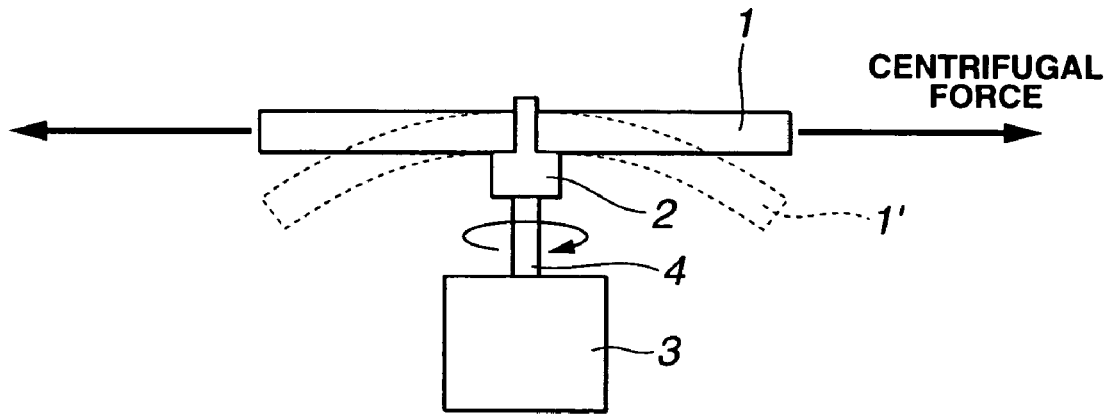
FIG. 1 shows a fundamental aspect showing a mold disc plate 1 put on a disc bench 2 for spinning with a spin driver 3, according to a first embodiment (fundamental) of the present invention.

As is seen in FIG. 1, there is provided a disc plate 1 and a mold disc plate 1', according to a first embodiment (fundamental) of the present invention. The mold disc plate 1' soon after being taken out of a metal mold is high in temperature, and is sufficiently soft. Especially, when a production cycle time is rapid, a circumferential warp of the mold disc plate 1' is enlarged due to various factors such as; a wind pressure during conveyance, a stress attributable to fixed absorption, a stress during molding operation, and a dead weight of the mold disc plate 1'. Under the present invention, when the mold disc plate 1' is high in temperature and is soft (in other words, before the resin material of the mold disc plate 1' is solidified), the mold disc plate 1' is put on a disc bench 2 for spinning at a high speed, as is seen in FIG. 1. With this, a centrifugal force is applied to the mold disc plate 1' in such a manner as to cause a tensile force radially outward. With the thus applied tensile force, the warp of the mold disc plate 1' is reduced. Herein, the high speed is not lower than 3,000 rpm, more preferably not lower than 4,000 rpm, to be described more in detail later on.

As is seen in FIG. 1, the mold disc plate 1' is depicted with a chain line. The mold disc plate 1' is high in temperature, and is sufficiently soft. An ordinary conveyer (not shown) fixedly absorbs the mold disc plate 1' and conveys the mold disc plate 1', so as to put the mold disc plate 1' on the disc bench 2. The disc bench 2 has an absorption measure (not shown) for absorbing the mold disc plate 1' in a plurality of spots in the vicinity of an internal periphery of the mold disc plate 1'. The disc bench 2 is connected to a spin shaft 4, or is integrated with the spin shaft 4. The spin shaft 4 is spun by means of a spin driver 3. Though not seen in FIG. 1, the disc bench 2 has an absorption portion which is connected to an external vacuum pump mechanism (not shown) by way of the spin shaft 4. In a comparatively short time, the spin driver 3 is accelerated to a predetermined high speed (more specifically for example, 10,000 rpm). Various kinds of measurement data on the mold disc plate 1' have been obtained through the following three operations:

Operation 1. The mold disc plate 1' is taken out of the metal mold, with the mold disc plate 1' having a high temperature.

Operation 2. Soon after Operation 1, the mold disc plate 1' is fixedly absorbed with the disc bench 2 substantially at a room temperature.

Operation 3. The spin driver 3 spins the mold disc plate 1' to the predetermined speed (accelerated), so as to obtain the various kinds of measurement data. Herein, some of the measurement data are to be described.

Described hereinafter is about the data obtained through the measurements.

Figure 2:
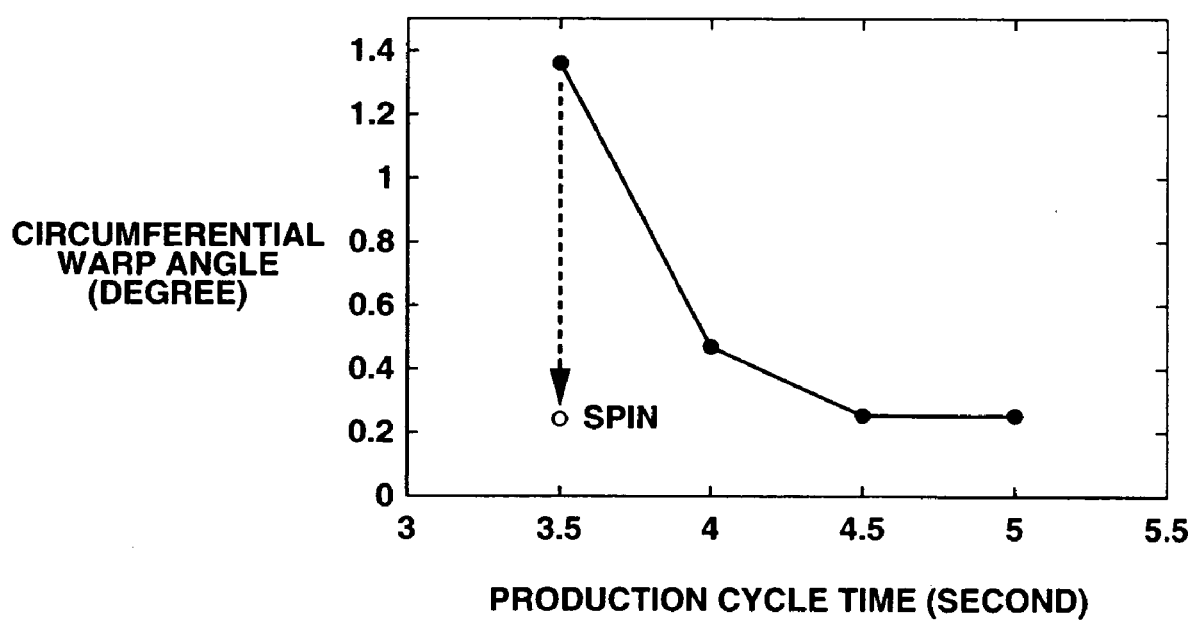
FIG. 2 shows a production cycle time relative to a circumferential warp angle of the mold disc plate 1.

According to the first embodiment, as is seen in FIG. 2, the production cycle time is defined not less than 3.5 seconds due to capability of measurement equipment. More specifically, as the production cycle time is decreased from 4.0 seconds to 3.5 seconds (in other words, the production speed is increased), conveyance speed {for conveying the mold disc plate 1' from a mold machine (not shown) to a cooling stage} and the like are increased. Thereby, the circumferential warp of the mold disc plate 1' becomes large rapidly. When the mold disc plate 1' is spun at high speed as is seen in FIG. 1, the warp is reduced to a great extent. This great reduction in the warp is true even when the production cycle time is 3.5 seconds that ordinarily causes the largest warp in the measurement range. The above summarizes that spinning the mold disc plate 1' at high speed applies the centrifugal force to the mold disc plate 1', to thereby cause the tensile force radially outward. Therefore, the reduction in the warp is continued until the resin material is solidified.

Described hereinafter is the spin speed (of the mold disc plate 1') that is greatly responsible for the reduction of the warp.

Figure 3A:
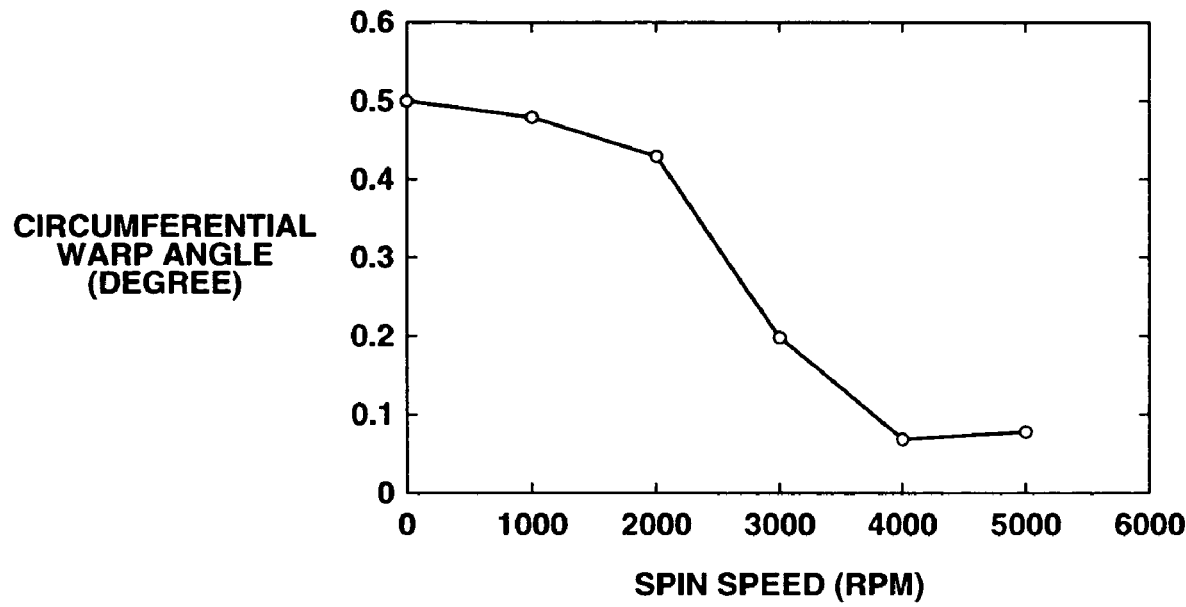
FIG. 3(A) shows a spin speed relative to the circumferential warp angle of the mold disc plate 1.
Figure 3B:
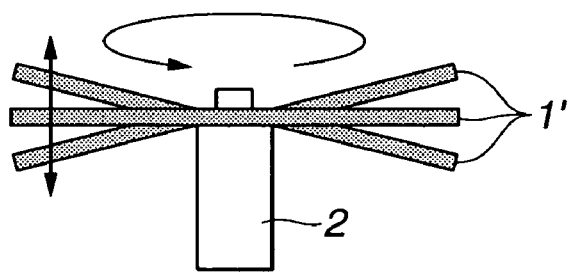
FIG. 3(B) shows a warp of the mold disc plate 1' at a spin speed lower than 3,000 rpm.
Figure 3C:
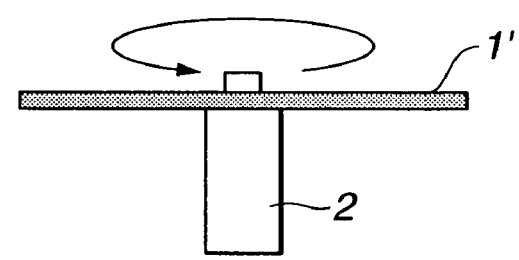
FIG. 3(C) shows the warp angle of the mold disc plate 1' at the spin speed not lower than 3,000 rpm.

As is seen in FIG. 3(A), FIG. 3(B) and FIG. 3(C), there are provided the measurement data obtained through measurement (circumferential warp angle) of the mold disc plate 1' (sample) under the following two conditions: i) Room temperature. ii) Spin speed of 1,000 rpm, 2,000 rpm, 3,000 rpm, 4,000 rpm, and 5,000 rpm, with a rapid increase in a short time between each two adjacent spin speeds. As is seen in FIG. 3(A), an ordinate shows the circumferential warp angle at each spin speed. As the spin speed of the mold disc plate 1' is increased to about 4,000 rpm, the circumferential warp angle of the mold disc plate 1' is reduced. At not lower than 4,000 rpm, however, the circumferential warp angle of the mold disc plate 1' is scarcely reduced, in other words, remains substantially constant. Therefore, the spin speed of about not lower than 4,000 rpm is the most effective for reducing the circumferential warp angle.

When the spin speed of the mold disc plate 1' is lower than 4,000 rpm, the warp of the mold disc plate 1' is also reduced, as is seen in FIG. 3(A). This paraphrases that even the spin speed lower than 4,000 rpm is still effective for reducing the warp and cooling the mold disc plate 1'.

However, as is seen in FIG. 3(B), when the spin speed of the mold disc plate 1' is lower than 3,000 rpm, the mold disc plate 1' cause an upward-downward movement (wave), in other words, the mold disc plate 1' is not stable in the horizontal direction. Even in this case, the entire warp can be reduced.

To the contrary, as is seen in FIG. 3(C), when the spin speed of the mold disc plate 1' is not lower than 3,000 rpm, the upward-downward movement is substantially prevented (no wave), in other words, the mold disc plate 1' is stable in the horizontal direction and the warp is considerably reduced. An allowable limit of the warp angle is 0.3° for the DVD which is constituted of two mated (adhered) plates. The warp angle of one piece of mold disc plate 1' for the DVD is not specifically limited. When the spin speed is about 3,000 rpm, the warp angle is not more than 0.2 (considerably small). Mating (adhere) the thus obtained two mold disk plates 1' makes the DVD which has the warp angle lower than 0.3° (allowable limit). Therefore, the spin speed of the mold disc plate 1' is preferably not lower than 3,000 rpm, more preferably not lower than 4,000 rpm.

Figure 4:
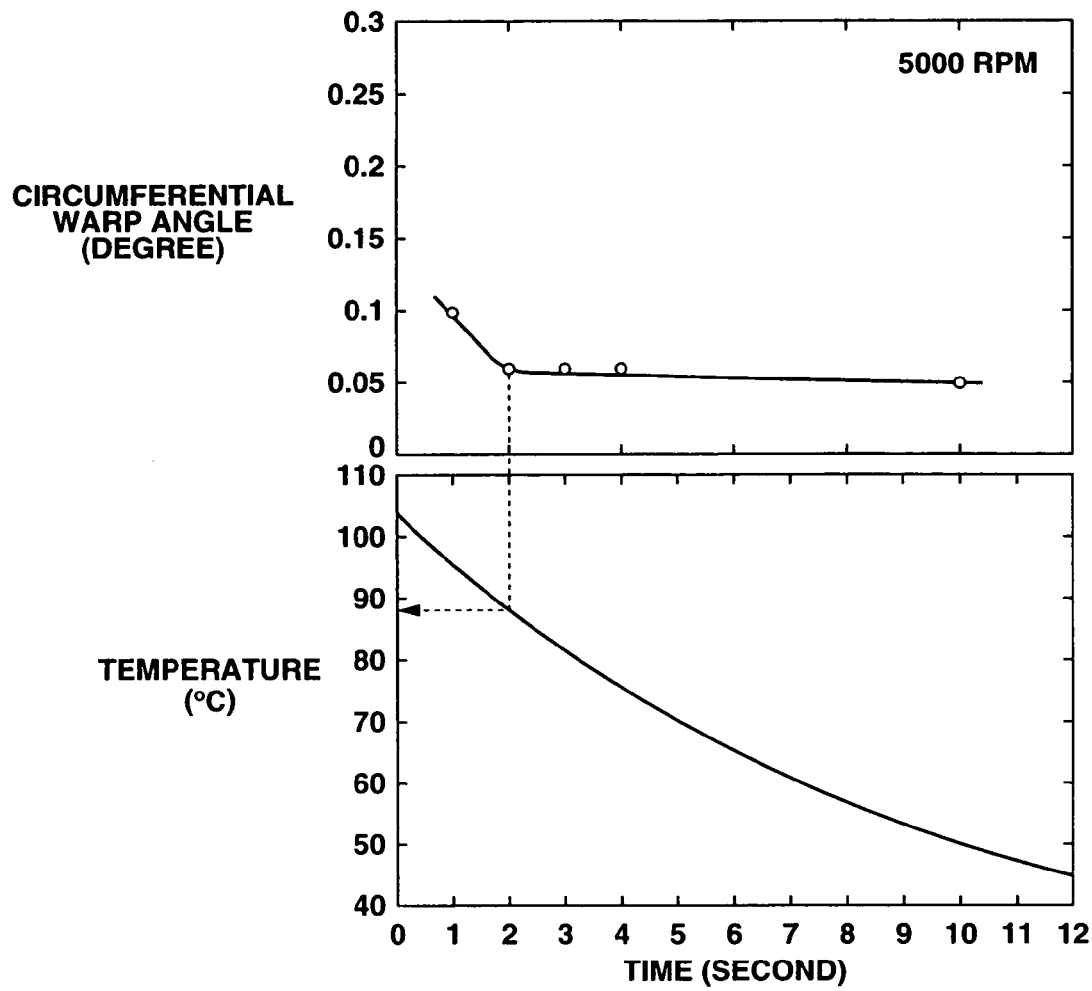
FIG. 4 shows time relative to i) the circumferential warp angle and to ii) temperature of the mold disc plate 1'.

Herein, spinning the mold disc plate 1' causes a forced air-cooling to the mold disc plate 1'. Thereby, the mold disc plate 1' is more rapidly reduced in temperature than self-cooling (left at rest). More specifically, as is seen in FIG. 4, in a condition of room temperature and spin speed 5,000 rpm, about two seconds is required for the resin material to be reduced to about 90° C. at which the resin material starts solidification. When the mold disc plate 1' is reduced in temperature to not higher than 90° C., the warp is not reduced even at 5,000 rpm. This proves that the solidification temperature of the resin material of the mold disc plate 1' is about 90° C, according to the first embodiment.

It is preferred to stop the above high spin speed after the mold disc plate 1' is solidified into the disc plate 1. In this manner, the centrifugal force is applied to the mold disc plate 1' until the mold disc plate 1' is solidified, to thereby reduce effectively the warp which is attributable to a strain during the solidification.

Figure 5:
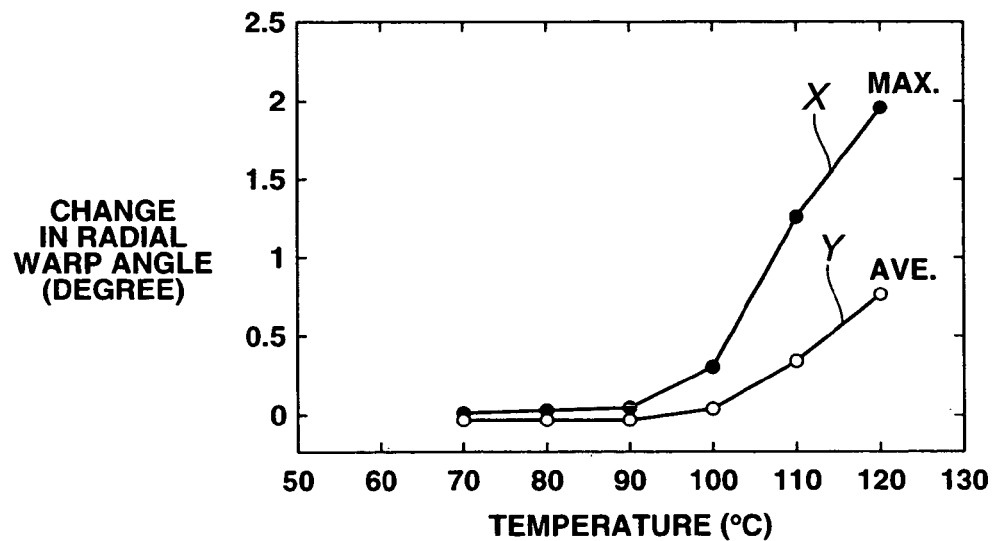
FIG. 5 shows temperature relative to change in a radial warp angle of the mold disc plate 1'.

Moreover, as is seen in FIG. 5, there is provided a graph showing a maximum temperature relative to a change in radial warp angle. The maximum temperature is the one obtained when the mold disc plate 1' is heated to a high temperature and then cooled down by self-cooling (left at rest). The change in the radial warp angle is a difference between the radial warp angle before and after heating the mold disc plate 1'. When the mold disc plate 1' is not higher than 90° C., substantially no change is observed in the radial warp angle.

In FIG. 5, a curve X shows a change in a maximum radial warp angle obtained with some samples of the mold disc plate 1'. When the mold disc plate 1' is in a range from 100° C. to 90° C., the change in the maximum radial warp angle considerably is reduced. At not higher than 90° C., the curve X scarcely shows the change in the maximum radial warp angle (substantially constant change). On the other hand in FIG. 5, a curve Y shows a change in an average radial warp angle obtained with some samples of the mold disc plate 1'. When the mold disc plate 1' is in the range from 100° C. to 90° C., the change in the average radial warp angle is reduced. At not higher than 90° C., the curve Y shows substantially a constant change in the average radial warp angle. The above summarizes that the resin material of the mold disc plate 1' is solidified at substantially 90° C.

Figure 6:
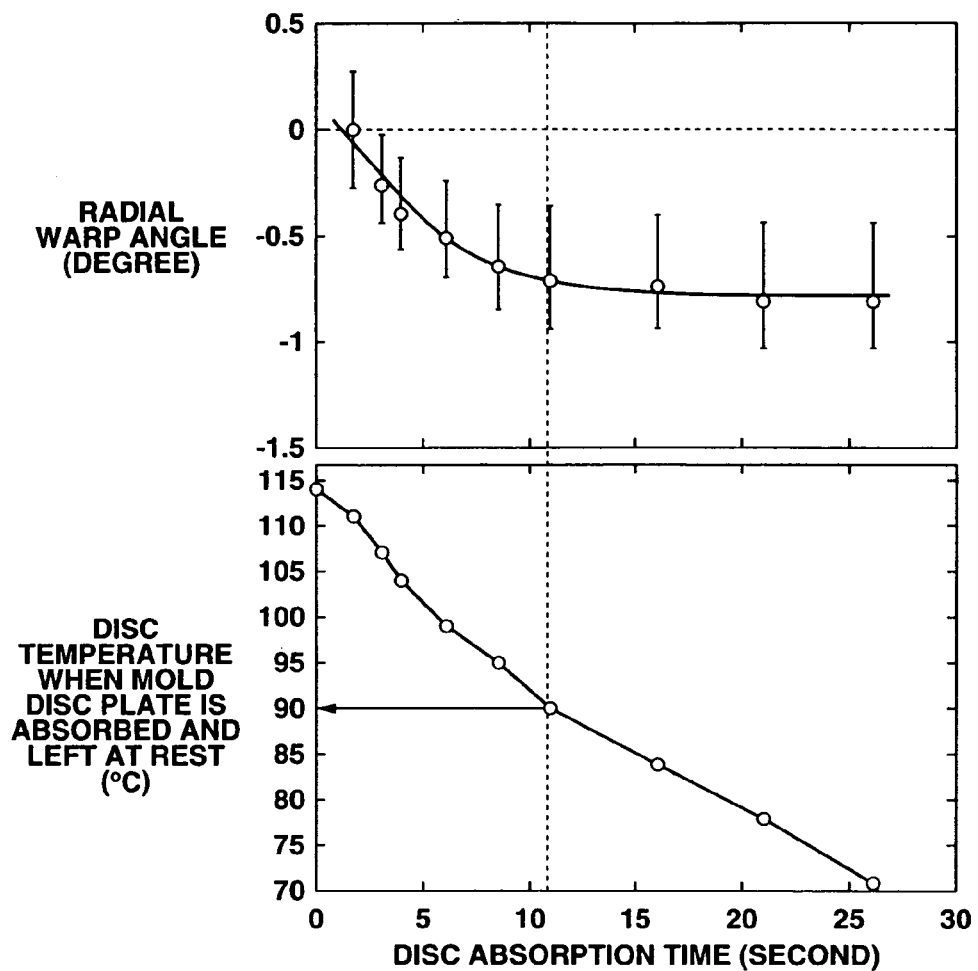
FIG. 6 shows a disc absorption time relative to i) the radial warp angle and to ii) a disc temperature when the mold disc plate 1' is absorbed and is left at rest.

Moreover, as is seen in FIG. 6, there is provided a graph showing a disc absorption time relative to i) the radial warp angle of the mold disc plate 1' and relative to ii) the temperature of the mold disc plate 1'. The mold disc plate 1' is fixedly absorbed on the disc bench 2 in FIG. 1, and is left at rest. At an early stage, the radial warp angle is rapidly increased. After 11 seconds or 12 seconds, the radial warp angle becomes stable (substantially constant). At this point in time, the mold disc plate 1' is 90° C. This concludes that the resin material of the mold disc plate 1' is solidified at about 90° C.

Summarizing above, the temperature of the mold disc plate 1' is an influential factor for reducing the warp. In addition to the forced air cooling by spinning the mold disc plate 1', other types of forced air cooling (before spinning and during spinning) are also influential for reducing the warp.

Described in the following four embodiments (second, third, fourth and fifth) is the forced air cooling of the mold disc plate 1'. In the following four embodiments, the forced air cooling is other than the one obtained by merely spinning the mold disc plate 1'.

Figure 7:
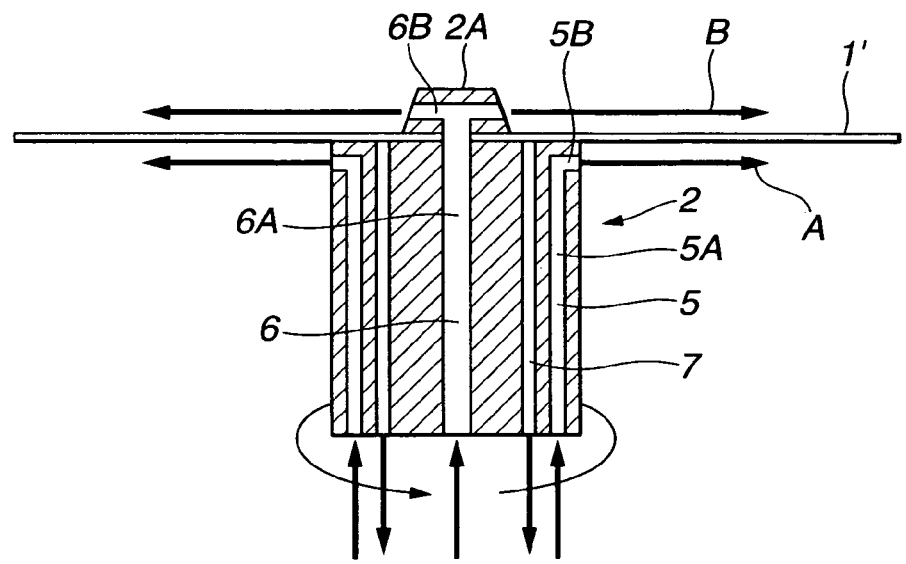
FIG. 7 is a method of cooling the mold disc plate 1' (forced air cooling), according to a second embodiment of the present invention.

As is seen in FIG. 7, there is provided a forced air cooling method, according to a second embodiment.

The disc bench 2 has three air flow passages, that is, a first air flow passage 5 (referred to as "air flow passage" in WHAT IS CLAIMED IS), a second air flow passage 6 (referred to as "air flow passage" in WHAT IS CLAIMED IS), and a third air flow passage 7,. which three air flow passages are also disposed in a spin shaft (not shown) connecting with the disc bench 2. The first air flow passage 5 is disposed most outside, and is constituted of a vertical passage 5A and a horizontal passage 5B extending perpendicularly to the vertical passage 5A. When the mold disc plate 1' is put on the disc bench 2, the horizontal passage 5B extends radially outward in a position right below the mold disc plate 1'. The horizontal passage 5B is provided with a jet nozzle for jetting out an air flow A. The air flow A thus jetted out of the horizontal passage 5B flows radially outward along a lower surface of the mold disc plate 1'. The second air flow passage 6 is disposed substantially in the center of the disc bench 2, and is constituted of a vertical passage 6A and a horizontal passage 6B. The vertical passage 6A extends to a center protrusion 2A (referred to as "center area" in WHAT IS CLAIMED IS) of the disc bench 2, while the horizontal passage 6B is formed in the center protrusion 2A. The center protrusion 2A passes through substantially a center (hole) of the mold disc plate 1', and protrudes higher than an upper surface of the mold disc plate 1'. When the mold disc plate 1' is put on the disc bench 2, the center protrusion 2A extends radially outward in a position right on the upper surface of the mold disc plate 1'. The center protrusion 2A has a jet nozzle for jetting out an air flow B. The air flow B thus jetted out of the horizontal passage 6B flows radially outward along the upper surface of the mold disc plate 1'. The air flow A on the lower surface and the air flow B on the upper surface help encourage cooling of the mold disc plate 1' without causing harmful effect on the reduction of, warp of the mold disc plate 1'. Moreover, according to the second embodiment, adjusting the air {temperature and strength (speed)} flowing in the first air flow passage 5 and the second air flow passage 6 brings about substantially a uniform cooling effect on the lower surface and the upper surface of the mold disc plate 1', to thereby further reduce the warp.

The third air flow passage 7 is an ordinary absorption passage. More specifically, the third air flow passage 7 absorbs a non-information record area in a plurality of spots, so as not to reduce reliability of reading the information. The non-information record area is disposed on an internal periphery of the mold disc plate 1'. Although not seen in FIG. 7, each of the first air flow passage 5 and the second air flow passage 6 is connected to an air supply mechanism, while the third air flow passage 7 is connected to an absorption mechanism. The disc bench 2 supports the non-information record area on the internal periphery of the mold disc plate 1', for the following two purposes: i) Reduce (make as small as possible) the warp of the mold disc plate 1'. ii) Maintain (not to reduce) reliability of reading the information. The disc bench 2 has such a "small diameter" as not to reach an internal periphery of an information record area. If the disc bench 2 has as large a diameter as that of the mold disc plate 1', and has the room temperature; the mold disc plate 1' is rapidly cooled on its lower surface only. Thereby, the mold disc plate 1' causes the warp at substantially the same time the mold disc plate 1' is put on the disc bench 2. In this case, the disc bench 2 should preferably be higher than 90° C. (not lower than 90° C. is the solidification temperature of the resin material of the mold disc plate 1'). However, this "higher than 90° C." of the disc bench 2 is not practically obtainable due to the time spent on cooling the mold disc plate 1', and on heating and cooling the disc bench 2. As a result, the disc bench 2 preferably has the above double-quoted "small diameter."

Figure 8:
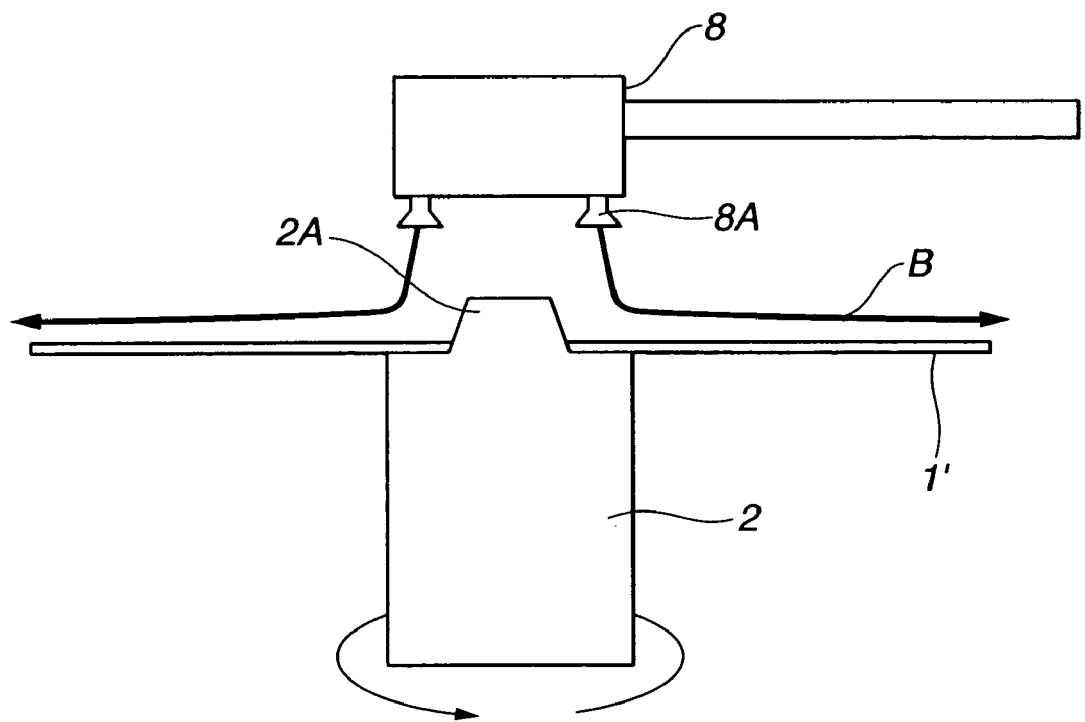
FIG. 8 is a method of cooling the mold disc plate 1' (forced air cooling), according to a third embodiment of the present invention.

As is seen in FIG. 8, there is provided a forced air cooling method, according to a third embodiment.

There is provided the disc bench 2, and a transfer mechanism 8 which has an absorption function (absorber pad 8A) and an air jet function. The transfer mechanism 8 puts the mold disc plate 1' on the disc bench 2. After the transfer mechanism 8 releases the mold disc plate 1' by quitting absorbing the mold disc plate 1', the transfer mechanism 8 stops in such a manner as to stay lifted to some extent from the mold disc plate 1'. Then, the transfer mechanism 8 jets out the air flow B from the absorber pad 8A. When the absorber pad 8A releases the mold disc plate 1', the disc bench 2 starts spinning at high speed, to thereby spin the mold disc plate 1' at a predetermined spin speed (for example, 4,500 rpm for about two seconds). The absorber pad 8A is connected to an absorption mechanism (not shown) and an air supply mechanism (not shown). When the transfer mechanism 8 releases the mold disc plate 1' and stops in such a manner as to stay lifted to some extent from the mold disc plate 1', the absorber pad 8A is automatically switched to the air supply mechanism. With this, the absorber pad 8A jets out the air flow B. The thus jetted out air flow B flows radially outward from substantially the center of the mold disc plate 1' which is at high spin speed. The air flow B accelerates cooling of the mold disc plate 1'.

Figure 9:
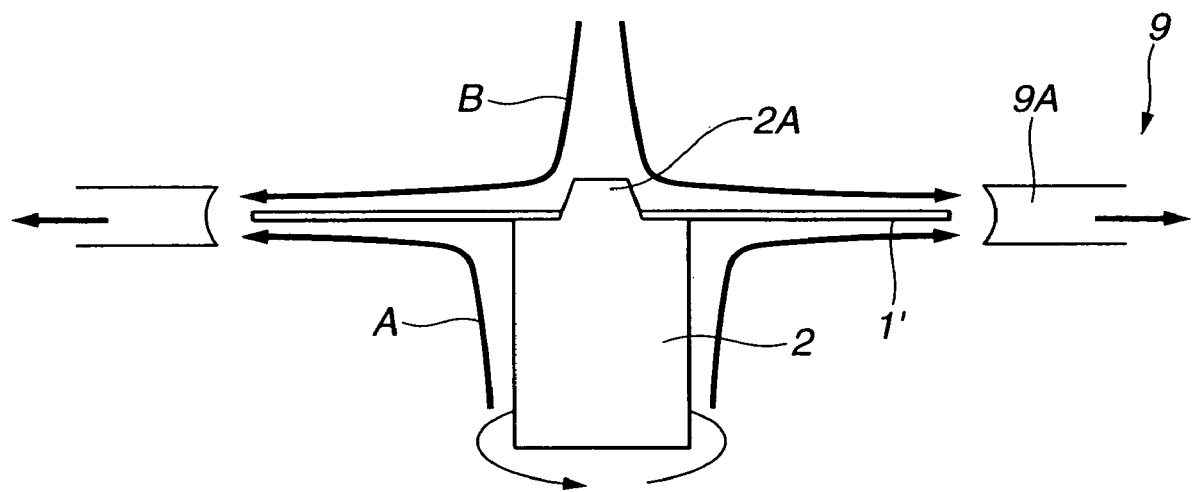
FIG. 9 is a method of cooling the mold disc plate 1' (forced air cooling), according to a fourth embodiment of the present invention.

As is seen in FIG. 9, there is provided a forced air cooling method, according to a fourth embodiment.

There is provided an absorption mechanism 9 which absorbs the air in a position slightly remote from an external periphery of the mold disc plate 1' in the horizontal direction in FIG. 9. In some extent, the absorption mechanism 9 is larger than the mold disc plate 1' in diameter. More specifically, the absorption mechanism 9 has a circular ring 9A having an internal diameter larger than an external diameter of the mold disc plate 1' by 6 mm to 10 mm. Moreover, the absorption mechanism 9 has an ordinary absorber (not shown) which is connected to the circular ring 9A by way of an absorption passage. The absorption mechanism 9 starts absorbing the air substantially simultaneously with the time the mold disc plate 1' is put on the disc bench 2. The absorption of the air causes the air flow A along the lower surface of the mold disc plate 1' and the air flow B along the upper surface of the mold disc plate 1', to thereby accelerate cooling of the mold disc plate 1'.

It is only the cooling function (of the air flow A and the air flow B) that is described in the second embodiment in FIG. 7, the third embodiment in FIG. 8, and the fourth embodiment in FIG. 9. In addition to the cooling function, the air flow A and the air flow B reduce the failure that the mold disc plate 1' does not spin stably horizontally due to the upward-downward movement (wave) of the mold disc plate 1' at the spin speed lower than 3,000 rpm, as is seen in FIG. 3(B). Moreover, adjusting the air flow A and the air flow B in strength (speed) greatly contributes to reduction of the warp of the mold disc plate 1'.

Practically, the production cycle time "restricts" the time spent on the spin speed lower than 3,000 rpm. Therefore, the mold disc plate 1' preferably takes the following sequential operations:

i) The mold disc plate 1' is cooled down as early as possible in a condition that the warp is reduced at high spin speed.

ii) The mold disc plate 1' solidifies into the disc plate 1. In other words, the mold disc plate 1' is reduced to not higher than 90° C.

iii) The disc plate 1 stops spinning.

Figure 14:
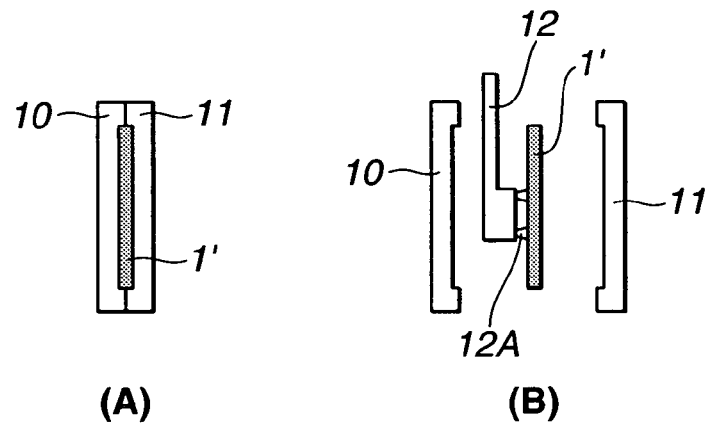
FIG. 14 {FIG. 14(A), FIG. 14(B), and FIG. 14(C)} shows a fundamental aspect of a warp of a mold disc plate 1', according to a related art.
Figure 14:
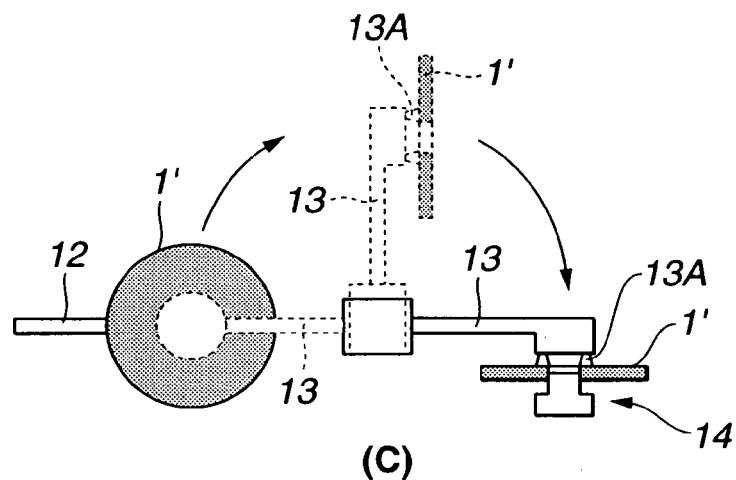
Figure 15:
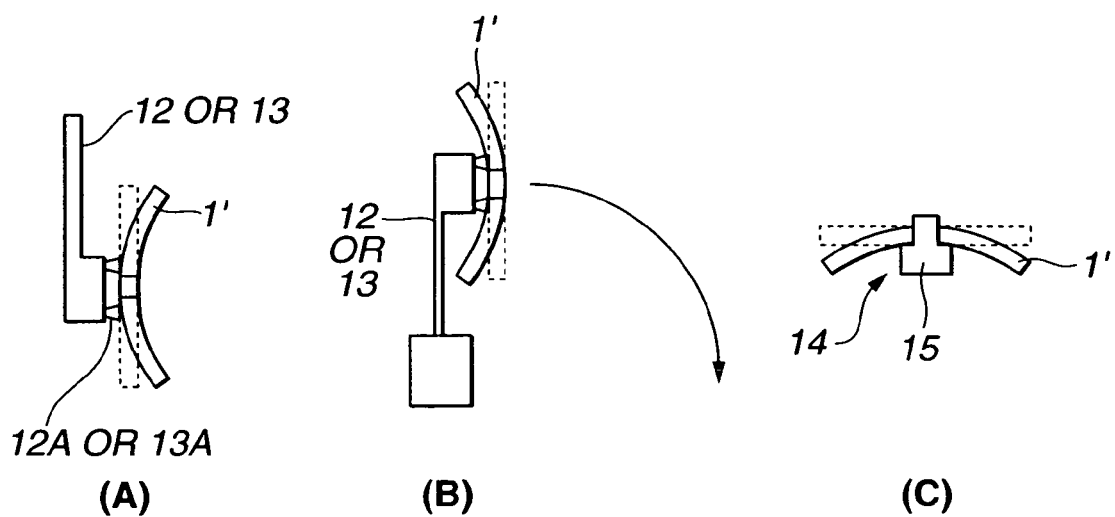
FIG. 15 shows three cases {FIG. 15(A), FIG. 15(B), and FIG. 15(C)} of causing the warp, according to the related art.

In addition, when the mold disc plate 1' is not higher than 90° C., namely, the mold disc plate 1' solidifies into the disc plate 1, the disc plate 1 takes the following sequential operations:

i) The disc plate 1 is conveyed to the conventional cooling stage 14 (see FIG. 14 and FIG. 15) at a predetermined point of time.

ii) The disc plate 1 is subjected to the self-cooling (air cooling) to such an extent as to be conveyable (sufficiently cooled) to a sputter machine (not shown) for forming a reflective film.

iii) The disc plate 1 is subjected to a sputtering operation.

In case the mold disc plate 1' has to be spun for a time longer than the above restriction (quoted as "restricts") of the production cycle time, two or more spin machines should be used in parallel in such a manner that the mold disc plate 1' is sequentially sorted. In this case, as a matter of course, the mold disc plate 1' can be reduced to not higher than 90° C. On top of that, the mold disc plate 1' can be further cooled down to such an extent as to be conveyable to the sputtering operation (next operation), in other words, without the need for the forced air cooling.

As is seen in FIG. 10(A), FIG. 10(B) and FIG. 10(C), there is provided a forced air cooling method, according to a fifth embodiment.

As described above, the mold disc plate 1' soon after being taken out of the mold machine is high in temperature and is sufficiently soft. The thus obtained mold disc plate 1' which is absorbed with the disc bench 2 is likely to make the warp larger. Therefore, it is preferable that only the internal periphery of the mold disc plate 1' is cooled at not higher than 90° C. More specifically, as is seen in FIG. 10(A), the disc bench 2 is blown by a cold air so as to be cooled at not higher than 90° C. Then, the mold disc plate 1' is put on the disc bench 2 with the cold air blowing to the mold disc plate 1'. In this case, the mold disc plate 1' is cooled both on the upper surface (with the cold air) and the lower surface (with the cooled disc bench 2). Thereby, adjusting the temperature and strength (speed) of the cold air prevents the warp. Then, the mold disc plate 1' is put on the thus cooled disc bench 2. Then, the mold disc plate 1' takes one of the following two operations: i) Keep the current condition for one second for cooling. ii) Lightly absorb the lower surface of the mold disc plate 1', and keep the condition for one second for cooling. Then, as is seen in FIG. 10(B), the mold disc plate 1' is absorbed more acceleratingly with vacuum. As is seen in FIG. 10(C), substantially simultaneously with the absorption with the vacuum, the mold disc plate 1' is spun at high speed.

Figure 11:
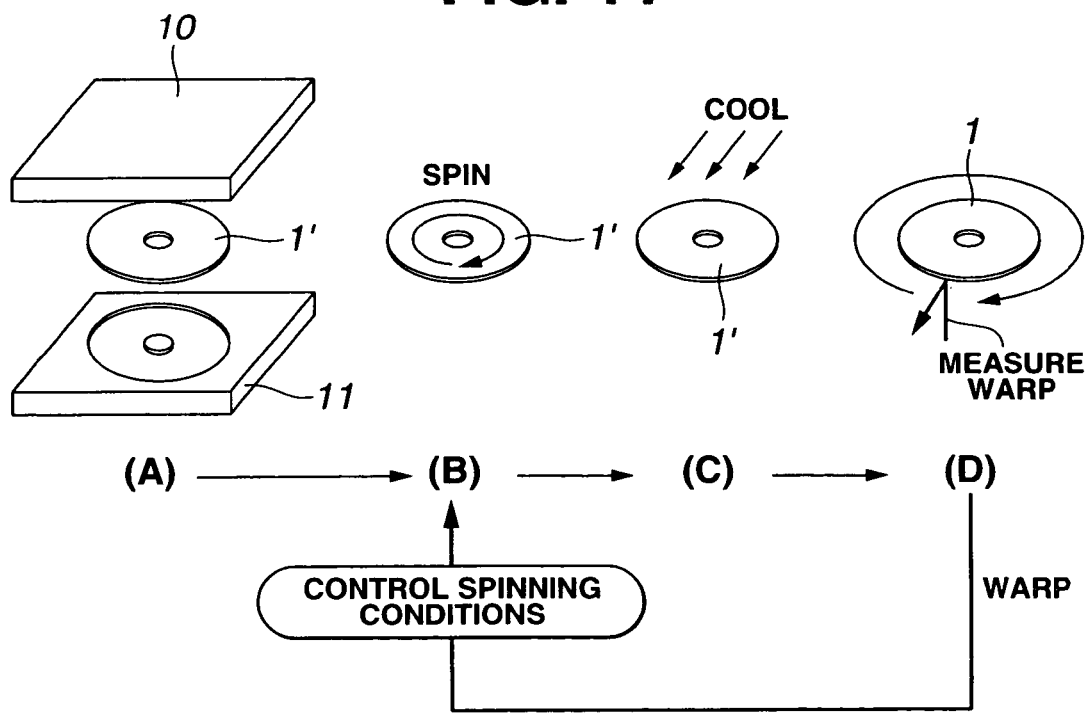
FIG. 11 shows a method of treating the disc plate 1, according to a sixth embodiment of the present invention.
Figure 12:
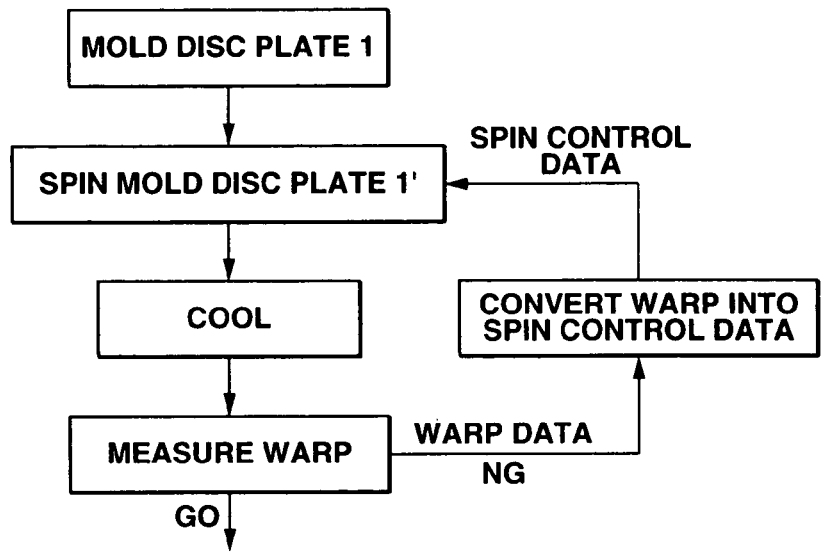
FIG. 12 is a schematic of the method of treating the disc plate 1, according to the sixth embodiment.

As is seen in FIG. 11 and FIG. 12, there is provided a method of treating the disc plate 1, according to a sixth embodiment.

The method according to the sixth embodiment has the following four operations:

(A) Take out the mold disc plate 1' from the first metal mold 10 and the second metal mold 11 of the mold machine.

(B) Put the mold disc plate 1' on the disc bench 2 (FIG. 1) for spinning at high speed.

(C) During the spinning operation at high speed, solidify the resin material of the mold disc plate 1' through another cooling method such as blowing cold air to the mold disc plate 1' or putting the mold disc plate 1' on a cooling stage (contact cooling), to thereby obtain the disc plate 1.

(D) Measure the warp caused to the disc plate 1.

In case the warp of the disc plate 1 is within the allowable limit, the spinning conditions are determined good and maintained. Then, the next mold disc plate 1' is to be spun under the thus maintained spinning conditions.

Contrary to this, in case the warp of the disc plate is out of the allowable limit, the warp is analyzed. The thus analyzed warp (data) is converted to a spin control data, so as to develop a control signal for controlling the spinning conditions. The control signal is inputted into the control circuit (not shown) of the spin driver 3 (in FIG. 1). Principally, the spinning conditions include spin speed, spin time, and spin speed rise time. According to the sixth embodiment, the spinning conditions for the mold disc plate 1' at the operation (B) is controlled referring to the warp of the disc plate 1 at the operation (D), as is seen in FIG. 11. The spinning conditions are stored in advance as a data base through various tests by relating the following three factors to the warp of the mold disc plate 1': 1. spin speed. 2. spin time. 3. spin speed rise time.

The machine for reducing the warp of the disc plate 1 is constituted of a warp measuring device and a converter-controller. The warp measuring device measures the warp of the disc plate 1. The converter-controller analyzes the thus measured warp based on the data base stored in advance, and then converts the warp into the spin control signal. The spin control signal is outputted to the spin driver 3 (in FIG. 1). The warp measuring device has a concept same as that of a laser displacement meter.

Described below is a principle of measurement by means of the laser displacement meter. The laser displacement meter applies the triangulation, and is constituted of a light emitter combined with a light receiver. The light emitter is a semiconductor laser. A laser beam emitted from the semiconductor laser is focused by means of a projector lens, and is irradiated to an object, namely the disc plate 1. Through the projector lens, a part of the thus irradiated laser beam focuses into a spot on the light receiver. When the disc plate 1 moves, the warp of the disc plate 1 changes an incident angle that corresponds to a reflection angle. Thereby, the spot on the light receiver also moves. Detecting the change in position of the spot determines a displacement (warp) of the disc plate 1. In addition to the measurement with the laser displacement meter, a charge coupled device (hereinafter referred to as "CCD") method can be used for measuring the warp of the disc plate 1, in such a manner as to measure the warp angle from a predetermined position on the CCD which receives the reflected light.

The warp detected through the laser displacement meter and/or the CCD method is analyzed based on the data base (stored in advance) showing the warp relative to the three factors, that is, the spin speed, the spin time, and the spin speed rise time. The thus analyzed warp is regarded as a controlled variable. The controlled variable is transmitted, as a control signal, to the spin driver 3 (in FIG. 1). In accordance with the dimension of the warp, the spin driver 3 controls the three factors of the disc bench 3, that is, the speed, the spin time, and the spin speed rise time. The thus adjusted (controlled) spin causes a proper centrifugal force applied to the mold disc plate 1', to thereby reduce the warp of the mold disc plate 1'. Simultaneously with this, the mold disc plate 1' is cooled, and then becomes the disc plate 1 having a small (reduced) warp.

Herein, as a matter of course, higher spin speed causes greater centrifugal force, and longer spin time provides longer operation time of the centrifugal force. The spin speed rise time is determined based on a stress applied to an absorption surface. In other words, cooling (of the mold disc plate 1', which cooling is attributable to spinning) and the stress should be so correlated as to reduce an influence of the stress.

Figure 10:
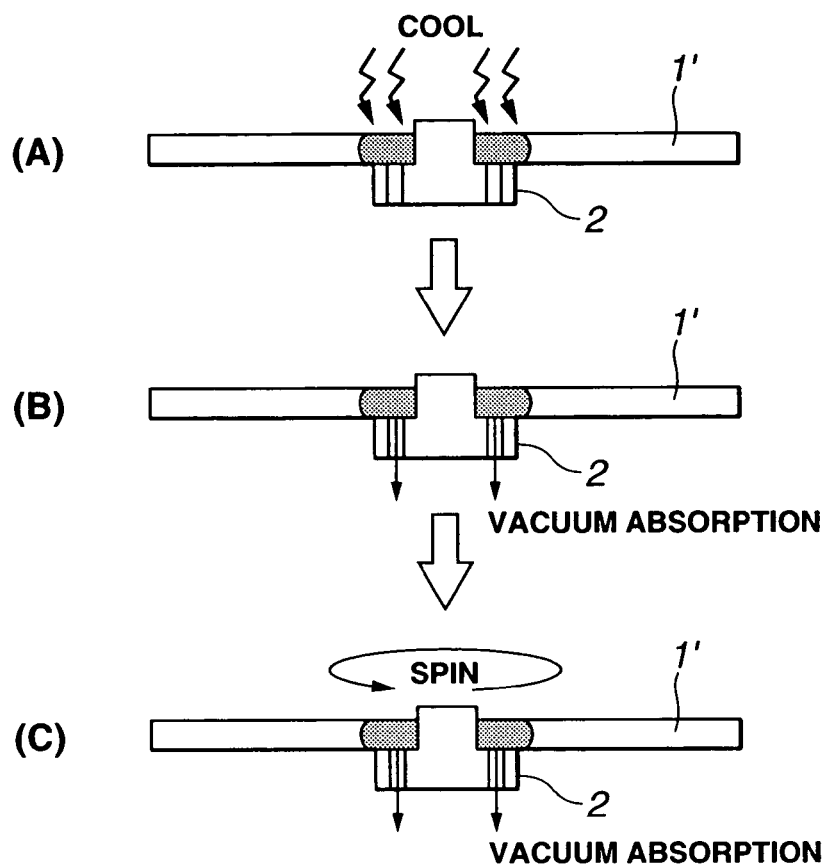
FIG. 10 {FIG. 10(A), FIG. 10(B), and FIG. 10(C)} is a method of cooling the mold disc plate 1' (forced air cooling), according to a fifth embodiment of the present invention.

The mold disc plate 1' soon after being taken out of the first metal mold 10 and the second metal mold 11 of the mold machine is high in temperature and considerably soft. Therefore, on occasions, the cold air should be blown to the mold disc plate 1' so as to obtain a proper softness as early as possible. Moreover, as described above, when the mold disc plate 1' is put on the disc bench 2 for absorbing the non-information record area of the mold disc plate 1', it is preferable to cool the mold disc plate 1'. This is because the non-information record area is less likely (or unlikely) to have scratches when the non-information record area is considerably hard. Therefore, as is seen in FIG. 10, preferably the disc bench 2 is cooled in advance with the cold air blown before the mold disc plate 1' is put on the disc bench 2. Unless cooled with the cold air, the disc bench 2 is heated with the mold disc plate 1'. This encourages importance of cooling the disc bench 2 in advance. In order to accelerate cooling of the mold disc plate 1', a cold air supply (not shown) is occasionally provided on the upper surface of the mold disc plate 1'. The control signal adjusts the temperature and speed of the cold air which is supplied by means of the cold air supply. The cold air is an air flow having a temperature of not higher than 90° C.

Figure 13:
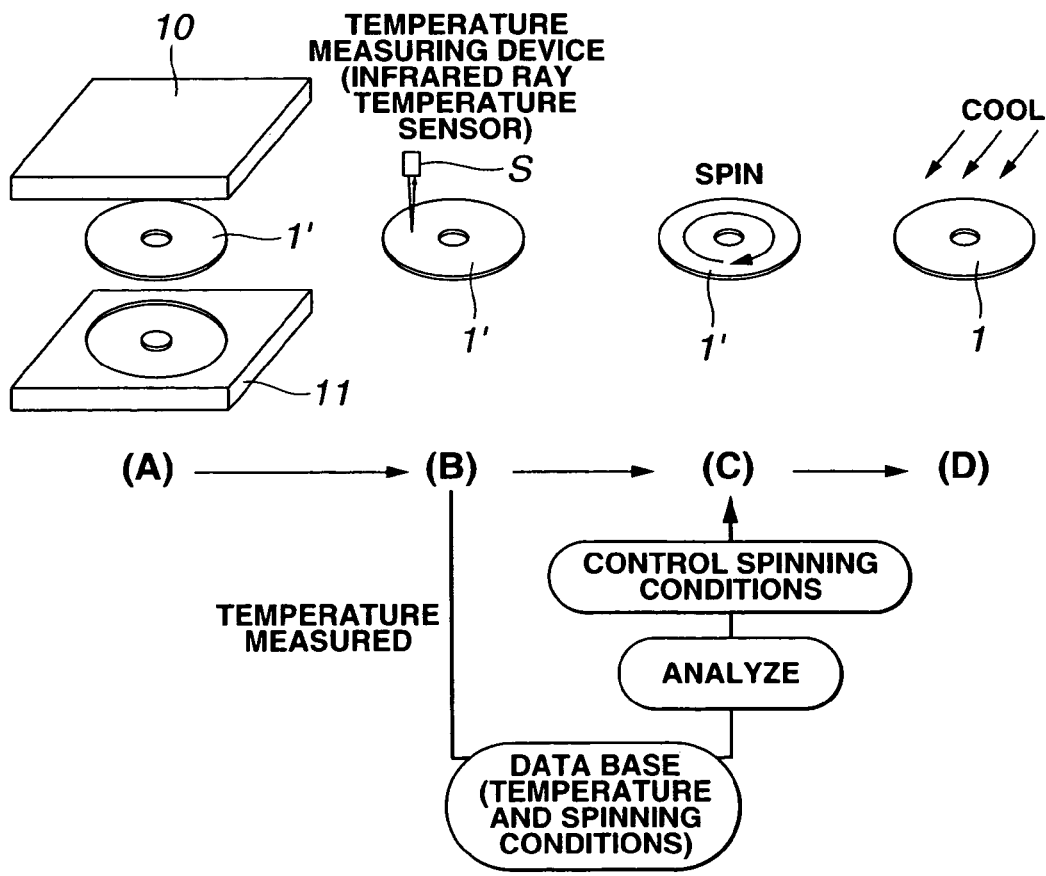
FIG. 13 shows a method of treating the disc plate 1, according to a seventh embodiment of the present invention.

As is seen in FIG. 13, there is provided a method of treating the disc plate 1, according to a seventh embodiment.

Members having the reference numerals same as those in FIG. 11 are equivalent members. In terms of temperature, the mold disc plate 1' taken out of the mold machine depends on the type of the mold machine and on the synthetic resin material of the disc plate 1. Occasionally, the same is true of softness. Therefore, the spinning conditions including spin speed, spin time, and spin speed rise time should preferably be adjusted in accordance with the temperature of the mold disc plate 1', so as to reduce the warp properly without causing any harmful effect such as absorption track mark adhered to other member.

The method according to the seventh embodiment has the following four operations:

(A) Take out the mold disc plate 1' from the first metal mold 10 and the second metal mold 11 of the mold machine.

(B) Measure the temperature of the mold disc plate 1' with a temperature measuring device S (such as an infrared ray temperature sensor).

(C) Spin the mold disc plate 1' at high spin speed for applying a centrifugal force, to thereby reduce the warp.

(D) Cool the mold disc plate 1' to obtain the disc plate 1 with the warp reduced.

Between the operation (B) and the operation (C), there is provided a sub-operation of controlling the spinning conditions at the operation (C) based on the temperature data obtained through the operation (B). Ordinarily, the temperature of the mold disc plate 1' is measured when the mold disc plate 1' is put on the disk bench 2 (in FIG. 1).

Hereinafter described. is the sub-operation {between the operation (B) and the operation (C)} of controlling the spinning conditions. At first, a method is determined in advance for adjusting the spinning conditions (such as spin speed, spin time, and spin speed rise time) in accordance with various temperatures, so as to minimize the warp of the mold disc plate 1'. The temperature and the spinning conditions obtained through the above method are used for developing the data base to memorize in the computer. The temperature of the mold disc plate 1' measured (detected) with the temperature measuring device S is analyzed based on the data base described above, so as to determine the controlled variable for generating the control signal giving proper spinning conditions. The thus generated control signal is transmitted to the spin driver 3 (in FIG. 1), to thereby control the spinning conditions (of the disc bench 2), that is, the spin speed, the spin time and the spin speed rise time, in accordance with the temperature of the mold disc plate 1'.

In case that adjusting the spinning conditions in accordance with only the temperature of the mold disc plate 1' is not enough for reducing the warp of the mold disc plate 1' (namely, if the warp of the mold disc plate 1' is not properly reduced due to the temperature of the mold disc plate 1'), the above cooling methods have proved to be effective. In this case, preferably the cooling power is adjusted (increased or decreased) in accordance with the measured temperature of the mold disc plate 1'.

The warp of the disc plate 1 is most properly reduced under the following four sequential operations:

i) Determine in advance the correlation between the temperature of the mold disc plate 1', and the warp of the disc plate 1.

ii) Develop and store the data based on the temperature and the warp.

iii) Analyze the measurement temperature of the mold disc plate 1' based on the data base.

iv) Control the cooling power.

The cooling power should not necessarily be adjustable (increased or decreased). More specifically, in order to simplify the cooling machine, the cooling power may be constant. Even being constant, the cooling power is effective to some extent for reducing the warp of the mold disc plate 1'.

According to the second embodiment (FIG. 7), the third embodiment (FIG. 8), the fourth embodiment (FIG. 9), the fifth embodiment (FIG. 10), the sixth embodiment (FIG. 11 and FIG. 12) and the seventh embodiment (FIG. 13), the cooling is a principal description.

The temperature of the mold disc plate 1' soon after being taken out of the mold machine depends on the type of the mold machine. More specifically, a temperature difference attributable to the discrete (different types of) mold machines is in a range of about 20° C.

Furthermore, in case that the mold disc plate 1' is subjected to the spinning operation for reducing the warp in a condition that the temperature of the mold disc plate 1' is lower by some tens of degrees centigrade than soon after the mold disc plate 1' is taken out of the mold machine, the temperature of the mold disc plate 1' is preferably maintained at higher than 90° C. during the spinning operation until the warp is reduced sufficiently. For maintaining the temperature at higher than 90° C., a high temperature air flow (higher than 90° C.) is blown to the mold disc plate 1', or the cooling speed is decreased. In this case, an air flow supply is provided having a function of supplying a hot air by means of a combination of an electric heater and a fan, or a function of irradiating directly the mold disc plate 1' by means of an infrared ray heater. In this case, the air flow higher than 90° C. is applied to the mold disc plate 1' for heating, in place of the cooling method according to the second embodiment (FIG. 7), the third embodiment (FIG. 8), the fourth embodiment (FIG. 9), the fifth embodiment (FIG. 10), the sixth embodiment (FIG. 11 and FIG. 12) and the seventh embodiment (FIG. 13).

Although the present invention has been described above by reference to seven embodiments, the present invention is not limited to the seven embodiments described above. Modifications and variations of the embodiments described above will occur to those skilled in the art, in light of the above teachings.

The entire contents of basic Japanese Patent Application No. P2001-092451 (filed Mar. 28, 2001) of which priority is claimed and basic Japanese Patent Application No. P2001-197738 (filed Jun. 29, 2001) of which priority is claimed are incorporated herein by reference.

The scope of the present invention is defined with reference to the following claims.

What is claimed is:

1. An apparatus for treating a disc plate, the apparatus comprising:
    a transfer mechanism arranged to transfer a mold disc plate obtained through an injection molding;
    a disc bench arranged to receive the mold disc plate transferred with the transfer mechanism;
    a spin driver arranged to spin the mold disc plate on the disc bench when a temperature of the mold disc plate is higher than 90° C., to thereby spin the mold disc plate;
    in which the mold disc plate becomes the disc plate at not higher than 90° C.;
    a warp measuring device for measuring a warp of the disc plate when the temperature of the mold disc plate is reduced to not higher than 90° C.; and
    a converter-controller for converting and controlling a datum, the converter-controller taking the following operations of:
        analyzing the warp of the disc plate,
        determining one of the following two of the mold disc plate, in accordance with a dimension of the analyzed warp of the disc plate:
            one of a spin speed, a spin time and a spin speed rise time, and
            a combination of the spin speed, the spin time and the spin speed rise time, and
        transmitting a control signal to the spin driver, the control signal controlling one of the following two of the mold disc plate:
            one of the spin speed, the spin time and the spin speed rise time, and
            the combination of the spin speed, the spin time and the spin speed rise time.

2. The apparatus for treating the disc plate as claimed in claim 1,
    wherein the spin driver is arranged to spin the mold disc plate on the disc bench at a spin speed equal to or higher than 3,000 rpm when the temperature of the mold disc plate is higher than 90° C., and to terminate a spinning operation of spinning the mold disc plate when the temperature of the mold disc plate becomes lower than or equal to 90° C.

3. An apparatus for treating a disc plate, the apparatus comprising:
    a transfer mechanism arranged to transfer a mold disc plate of resin obtained through an injection molding;
    a disc bench arranged to receive the mold disc plate transferred with the transfer mechanism;
    a spin driver arranged to spin the mold disc plate on a the disc bench when a temperature of the mold disc plate is higher than 90° C.;
    a warp measuring device for measuring a warp of the disc plate when the temperature of the mold disc plate becomes lower than or equal to 90° C.; and
    a controller to control a spinning condition of the spin driver in accordance with the warp of the mold disc plate, the spinning condition of the spin driver including at least one of a spin speed, a spin time and a spin speed rise time.

4. The apparatus for treating the disc plate as claimed in claim 3, in which the apparatus further comprises:
    a cooler for cooling the mold disc plate; and
    a heater for heating the mold disc plate.

5. The apparatus for treating the disc plate as claimed in claim 3,
    in which the mold disc plate becomes the disc plate at not higher than 90° C.;
    in which the apparatus further comprises:
        a temperature measuring device for measuring the temperature of the mold disc plate when the mold disc plate is reduced to not higher than 90° C., and one of the following two:
            a cooler for cooling the mold disc plate based on the temperature measured with the temperature measuring device, and
            a heater for heating the mold disc plate based on the temperature measured with the temperature measuring device;
    in which the cooling operation and the heating operation of the mold disc plate are carried out at a time one of the following two:
        before spinning the mold disc plate, and
        during spinning the mold disc plate; and
    in which the apparatus adjusts the temperature of the mold disc plate through one of the cooling operation with the cooler and the heating operation with the heater.

6. The apparatus for treating the disc plate as claimed in claim 4, in which
    the cooler blows out an air flow not higher than 90° C., and the heater blows out an air flow higher than 90° C.; and
    the air flow from the cooler and the air flow from the heater are blown out radially outward along a first surface and a second surface of the mold disc plate, by way of an air flow passage disposed in a spin shaft member of the disc bench.

7. The apparatus for treating the disc plate as claimed in claim 6, in which the apparatus adjusts at least one of a speed and a temperature of the air flow along each of the first surface and the second surface of the mold disc plate.

8. The apparatus for treating the disc plate as claimed in claim 3, wherein,
    the transfer mechanism includes a transfer arm arranged to transfer the mold disc plate in a soft state after an operation of forming the mold disc plate by injection molding;
    the disc bench is arranged to receive the mold disc plate in the soft state from the transfer arm; and
    the spin driver is arranged to spin the mold disc plate on the disc bench at a high spin speed equal to or higher than 3,000 rpm to reduce warp of the mold disc plate with a centrifugal force, from the soft state in which the mold disc plate is still soft after the injection molding, until the mold disc plate becomes hard.

9. The apparatus for treating the disc plate as claimed in claim 8, wherein the spin driver is arranged to spin the mold disc plate on the disc bench at the spin speed equal to or higher than 4,000 rpm.

10. The apparatus for treating the disc plate as claimed in claim 3, wherein the apparatus further comprises
    a temperature measuring device for measuring a temperature of the disc plate; and
    a controller to control a spinning condition of the spin driver in accordance with the temperature of the mold disc plate, the spinning condition of the spin driver including at least one of a spin speed, a spin time and a spin speed rise time.

* * * * *